US009454742B2

(12) United States Patent
Clemenson

(10) Patent No.: US 9,454,742 B2
(45) Date of Patent: Sep. 27, 2016

(54) SCHEDULE IMPACT MAP

(71) Applicant: HTS, Inc., Emeryville, CA (US)

(72) Inventor: William Clemenson, San Francisco, CA (US)

(73) Assignee: HTS, Inc., Emeryville, CA (US)

( * ) Notice: Subject to any disclaimer, the term of this patent is extended or adjusted under 35 U.S.C. 154(b) by 0 days.

(21) Appl. No.: 14/920,810

(22) Filed: Oct. 22, 2015

(65) Prior Publication Data

US 2016/0042309 A1    Feb. 11, 2016

Related U.S. Application Data

(63) Continuation of application No. 13/802,213, filed on Mar. 13, 2013, now Pat. No. 9,202,390.

(51) Int. Cl.
| | | |
|---|---|---|
| *G06G 7/48* | (2006.01) | |
| *G06Q 10/06* | (2012.01) | |
| *G06Q 10/10* | (2012.01) | |
| *G09B 29/00* | (2006.01) | |
| *G06Q 50/16* | (2012.01) | |

(52) U.S. Cl.
CPC ..... *G06Q 10/063114* (2013.01); *G06Q 10/109* (2013.01); *G09B 29/00* (2013.01); *G09B 29/007* (2013.01); *G06Q 50/165* (2013.01)

(58) Field of Classification Search
CPC ............ G06Q 10/06; G06Q 10/063114; G06Q 50/08; G06Q 10/00; G06Q 10/06315; G06Q 10/109; G06Q 50/105; G09B 29/00; G09B 29/007
See application file for complete search history.

(56) References Cited

U.S. PATENT DOCUMENTS

| | | | | |
|---|---|---|---|---|
| 8,510,137 B2 * | 8/2013 | Bonev | ............... | G06F 17/30029 705/1.1 |
| 8,510,148 B2 * | 8/2013 | Norman | ................. | G06Q 10/00 705/7.11 |
| 9,164,656 B1 * | 10/2015 | Keller | ................. | G06F 3/04817 |
| 2007/0245300 A1 * | 10/2007 | Chan | ..................... | G06Q 10/06 717/105 |
| 2008/0071562 A1 * | 3/2008 | Clemenson | ............ | G06Q 10/06 705/7.12 |
| 2008/0133303 A1 * | 6/2008 | Singh | .................... | G06Q 10/06 705/35 |
| 2009/0048899 A1 * | 2/2009 | Bender | ................. | G06Q 10/06 705/7.15 |
| 2009/0216602 A1 * | 8/2009 | Henderson | ............ | G06Q 10/00 705/7.41 |
| 2009/0276273 A1 * | 11/2009 | McIntosh | ....... | G06Q 10/063114 705/7.23 |
| 2012/0316930 A1 * | 12/2012 | Clemenson | ............ | G06Q 50/08 705/7.39 |
| 2013/0030860 A1 * | 1/2013 | Chaubey | ................ | G06Q 10/06 705/7.27 |
| 2013/0226546 A1 * | 8/2013 | Suyeyasu | ............... | G06Q 50/08 703/6 |
| 2014/0032257 A1 * | 1/2014 | Houle | .............. | G06Q 10/06315 705/7.25 |

OTHER PUBLICATIONS

Nageeb, M., "The effectiveness of the hybrid graphical representation method in visually combining and communicating logical and spatial relationships between scheduled activities", Texas A& M University, May 2012.*

* cited by examiner

*Primary Examiner* — Kandasamy Thangavelu
(74) *Attorney, Agent, or Firm* — Stratus Law Group

(57) ABSTRACT

Methods, systems, and apparatus are disclosed which include receiving an indication of a floor plan of a building project; receiving an indication of an inspection report, the inspection report associated with an inspection type; identifying a forecast date associated with each room in the floor plan, the forecast date indicating when an inspection type associated with the respective room is to be completed; for each room, determining how close each room's forecast date is to a present date, and if the room's forecast date is past the present date; generating a visual map of the floor plan; associating a color of each room in the floor plan based on the determining; and providing the visual map with the associated color of each room for display.

20 Claims, 8 Drawing Sheets

SCHEDULE IMPACT MAP

This application is a continuation of U.S. patent application Ser. No. 13/802,213, filed Mar. 13, 2013, which is hereby incorporated by reference herein in its entirety.

BACKGROUND

This disclosure relates generally to monitoring building construction.

During construction of large complex construction projects, integrated comprehensive collaborative Quality Control processes are required to support regulatory agencies, owner construction oversight, and general contractor oversight and subcontractor operations. In order to efficiently manage the construction process the general contractor and owner ideally would have up-to-the-minute status of every subcontractor, construction element, room and inspection. When information such as inspection, issue data and punch list data is delayed, the schedule impacts and associated costs accumulate.

SUMMARY

In general, one innovative aspect of the subject matter described in this specification may be embodied in methods that include the actions of receiving an indication of a floor plan of a building project; receiving an indication of an inspection report, the inspection report associated with an inspection type; identifying a forecast date associated with each room in the floor plan, the forecast date indicating when an inspection type associated with the respective room is to be completed; for each room, determining how close each room's forecast date is to a present date, and if the room's forecast date is past the present date; generating a visual map of the floor plan; associating a color of each room in the floor plan based on the determining; and providing the visual map with the associated color of each room for display.

Another aspect can be embodiment in methods that include the actions of receiving a selection of a floor of a building project, receiving a selection of an inspection type associated with the building project, receiving a selection of a forecast report, wherein the forecast report displays each room of the floor of the building project in a color indicating how close each room's assigned forecast date is to a present date, displaying a floor plan associated with the floor and inspection report, wherein the floor plan includes rooms that are each colored based on how close each room's assigned forecast date is to the present date.

Other embodiments of these aspects include corresponding systems, apparatus, and computer-readable medium storing software comprising instructions executable by one or more computers, which cause the computers to perform the actions of the methods.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements.

DETAILED DESCRIPTION

A system will be described that provides indications of project milestones to users of the system who are using it in order to track status of building construction. The system is robust enough to enable the orchestration of complex professional organizations, streamlining their interactive processes in order to minimize task duration, down time and unnecessary delays.

In one implementation, an inspection monitoring process is provided that provides real-time collaboration, process tracking, quality control timing, and status reporting associated with a construction project. The process can include reporting that allows a user to visually see how far out a project is from completion for each milestone.

Figure 1:
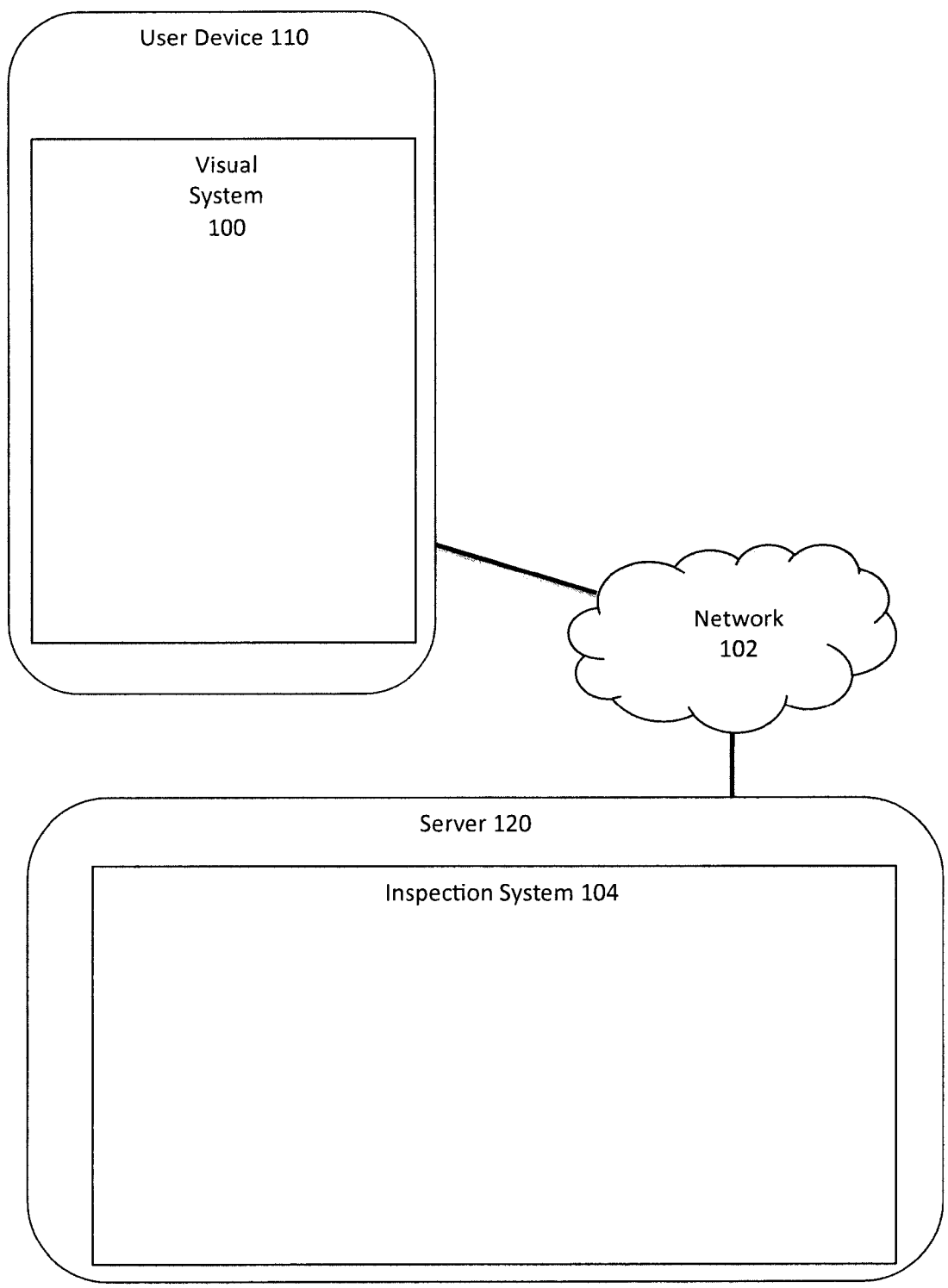
FIG. 1 illustrates a system for monitoring inspection.

FIG. 1 illustrates an example of a networked system of devices, perhaps mobile devices such as mobile phones, tablets or computers. The devices may be networked over network 102. Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

A user may operate a user interface on user device 110 to track forecast dates of milestones for a construction project. The milestone data, forecast data, and other data used to track forecast dates may be stored, accessed, distributed or modified using a system stored on and executed by server 120

User device 110 may be coupled to server 120 over network 102. Server 120 includes inspection system 104, which may be used to provide information to user device 110.

Visual system 100 may be implemented on or implemented with one or more computing devices, such as user device 110.

Inspection system 104 allows users to be able to track the status of different phases of a construction process. System 104 allows visual fragnets to be created that shows on a visual display the different status of various parts of a project. A visual fragnet is an interactive floor plan of a level of a building. For example, visual fragnets can be created to show the status of an inspection for a particular milestone in a project. Visual fragnets can also be created to show forecast completion dates associated with various milestones in a project.

Inspection system 104 first creates the maps that will be used by the system. These maps can be room-based maps, or they can be section based, area based, or equipment based. Inspection system 104 receives architectural drawings that are 2d or 3d, and converts these drawings to a 2D room based map. For example, if the construction project is for a hospital, each level of the hospital is associated with an architectural drawing. These maps are imported into inspection system 104 and they are then converted into 2D room based maps. These room-based maps are used by inspection system 104 to track various milestones associated with the project.

Visual System 100 allows user to interact with Inspection system 104 through network 102.

Each construction project can be made up of various project milestones. Project milestones are parts of a construction project that in total make up the complete construction phase of the project. For example, milestones can be Steel Erection, Fireproofing, Exterior Skin, In Wall Completion. The term "Milestone" is relative to the group that is using it. For example, the framing subcontractor may consider "In Wall Framing" a milestone because it's their scope. On the other hand, the General contractor may view "In Wall Framing" as an Activity. For the purposes of the proximity report showing how far out the forecast date is, a "Milestone" is a large phase of work comprised of smaller activities. "Milestones" can be Steel Erection, Fireproofing, In Wall Completion, Overhead Completion, etc. Each milestone has different activities associated with it. The activities are the different inspection request that make up a milestone like In Wall Framing, In Wall Plumbing, etc. Visual Fragnet reports can be run based on individual "Activities".

Milestones are set using standards by a general contractor or owner of a project. Milestone provides a sequence of inspection types that are organized and ordered to let the general contractor or owner know everything is done in a specific room or area prior to close-up. For example, the in wall milestone can include the following inspection types: framing inspection, electrical, and mechanical inspection.

In one embodiment, when a report such as a proximity report is run, it will show how far out each room is for that inspection type and the same can be done for a milestone that includes more than one inspection type. Therefore when a report is run for a milestone that includes multiple inspections. For example the in-wall milestone may includes 3 or 4 different inspection types. The rooms can be colored based on an average date of how far out all the inspection types are together. In another embodiment, each room can have multiple indications of different inspection types so each inspection type is colored in the room. For example, one room can include 3 colors, 1 color for each inspection.

Once a project is underway, various subcontractors will work on various rooms to complete different tasks associated with a milestone. As each task or activity is completed, system 110 receives the updated status for each task. When every task associated with a milestone is completed, the room is marked for inspection in system 110. An inspector then will inspect the room for a specific inspection type. The inspection type is tied to the milestone. For example, if the milestone is electrical, an electrical inspection of the room is performed.

A status of "new" is automatically assigned when a subcontractor creates an inspection request. Status "open" is selected by the General Contractor when they believe the request is ready to go to the inspectors. A status of "closed" is assigned for completed rooms, or "issue" is assigned for rooms that have issues, or "rejected" is a status for those rooms not even close to being done. An inspection type of "not applicable" may be applied to some rooms. For example, some rooms wont have plumbing so those rooms for the inspection type plumbing are marked as not applicable.

System 104 stores these statuses associated with each milestone. One room can be associated with many milestones.

Inspection system 104 allows the users to assign a Forecast Complete date to a specific set of rooms for a project. Subsequently, depending on the map or visual fragnet report that is being used, the forecasted room will automatically update to a different color based on how far the forecasted date is from the current date. This allows the project managers or general contractors or other users to easily identify the areas in the building that require the most attention in order to meet the forecasted goal.

In one embodiment the colorization of the rooms is standardized based on the report that is being run. However, reports that are based on colorizing the rooms by forecasted dates are colorized randomly. This is because it may not be clear how many different forecast are going to be used and are unable to decide which colors to use. It could happen that one floor plan will have 20 forecast dates for a single inspection type. Thus, the system assigns a random color to each date in that report.

A building has different areas and each area can be made up of one or more rooms. A user, for example a general contractor, pulls up map of the construction project on visual system 100, selects an inspection type like framing, and then highlights all areas in a certain area and adds a forecast date to those rooms specific to inspection type. The user does this for all the different inspection types. Inspection system 104 receives an indication of each of these selections and stores them.

System 104 stores the completion date associated with each room in the map. Therefore each room is associated with a completion date for each milestone. For example, room A in a hospital floor plan may be associated with a completion date of Jun. 1, 2013 for its electrical inspection, and Jul. 1, 2013 for its mechanical inspection. The milestone is a combination of inspection types. In this scenario, we have a different date for electrical and a different date for mechanical. What this means is that in the milestone for the row with room X, it will display one date for the electrical column and a different date for the mechanical column.

A user can run a report such as a forecast and proximity report using system 104. This map or visual fragnet provides the user with a special colorization sequence based on how close the forecast date is to the current date. This allows the user to quickly identify all the rooms that are near their forecasted date so that they can mobilize additional resources in order to meet their deadline. Additionally, once the room has been inspected and approved, it will show up in the "Closed" status to show that it is completed.

The user, using visual system 100, can first select a floor of a building, then select an inspection type. For example, electrical inspection or plumbing inspection. A map is loaded by system 104 for the specific inspection type and the floor selected.

Once the visual fragnet has finished loading, the user can utilize a visual fragnet key that is displayed relative to the map to obtain the associated data and identify the number of rooms that are close to or past their forecast date. Furthermore, the ranges can be customized to meet the project needs and updated over time if desired.

This colorized map or visual fragnet provides the user with a special colorization sequence showing the user exactly what rooms are assigned to which "Forecast Date" and which rooms have yet to be assigned.

This colorized map or visual fragnet provides the user with a special colorization sequence based on the real time status of the rooms as well as a forecast date for the rooms that are not yet completed. The user can utilize this map to view a comprehensive visual representation of the current and expected future status of the work.

Implementations of visual system 100 may be provided through a mobile application stored in computer-readable media of user device 110 and executed by one or more processors on the device. The application can display a user interface that is operated by the user. In some implementations, inspection system 104 may provide the functionality of future location system 100. On other implementations, the functionality of systems 100 and 104 may be provided through a browser.

Figure 2:
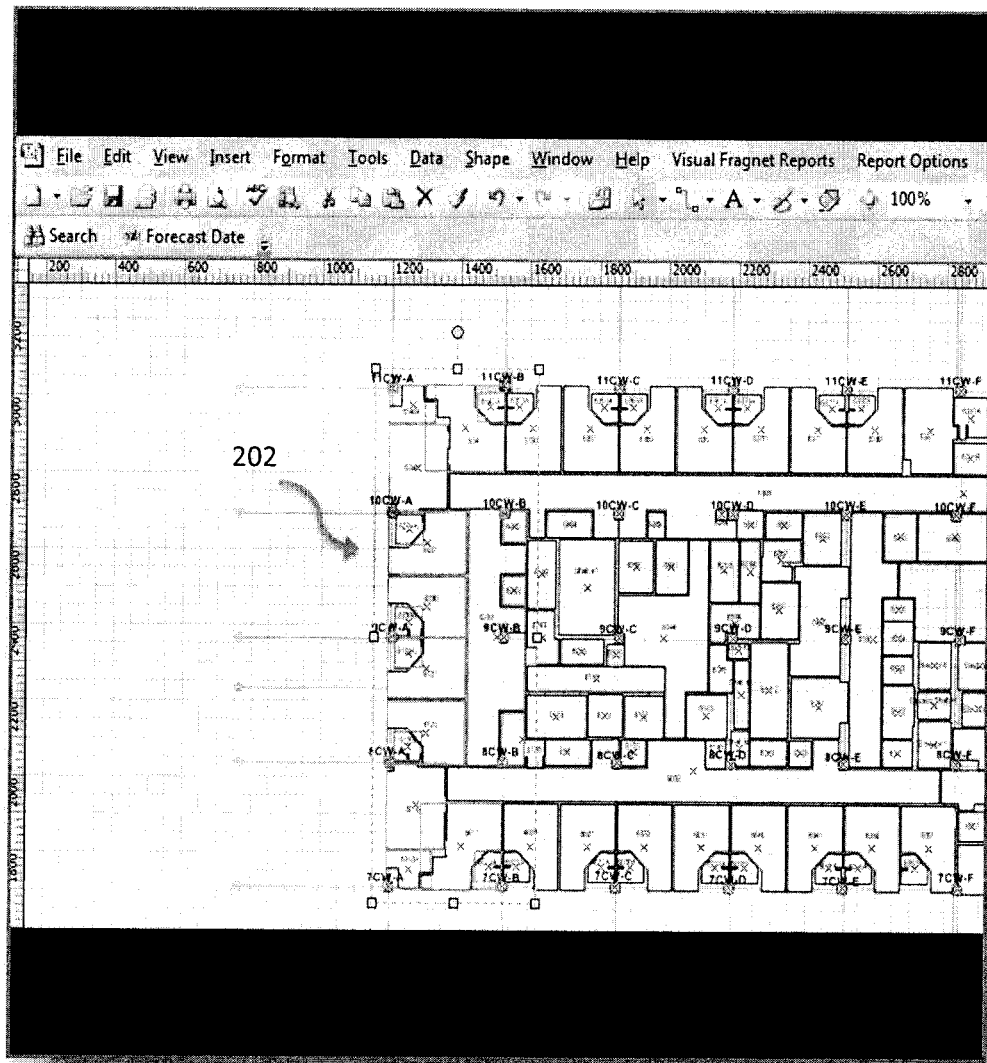
FIG. 2 illustrates a display view of a floor plan.

FIG. 2 is an example floor based map. The user first selects an inspection type and a level or map. The map in FIG. 2 may be a map of a hospital floor. As shown, none of the rooms are shaded they are all one color. The blank drawing means that there are currently no rooms with an assigned forecast date for that specific inspection. In order to assign a forecast date, the user will need to select the rooms, for example, rooms 202, you wish to update and then click on the "Forecast Date" button located in the upper left corner of the map. This will assign a forecast date to those rooms for the specific inspection selected. Once the user clicks on the "Forecast Date" button, a "Forecast Completion" screen appears. This screen provides the user with a list of all the rooms he/she has selected and will also show the user if those rooms have a "Custom Area" or a "Forecast Date" assigned to them.

Figure 3:
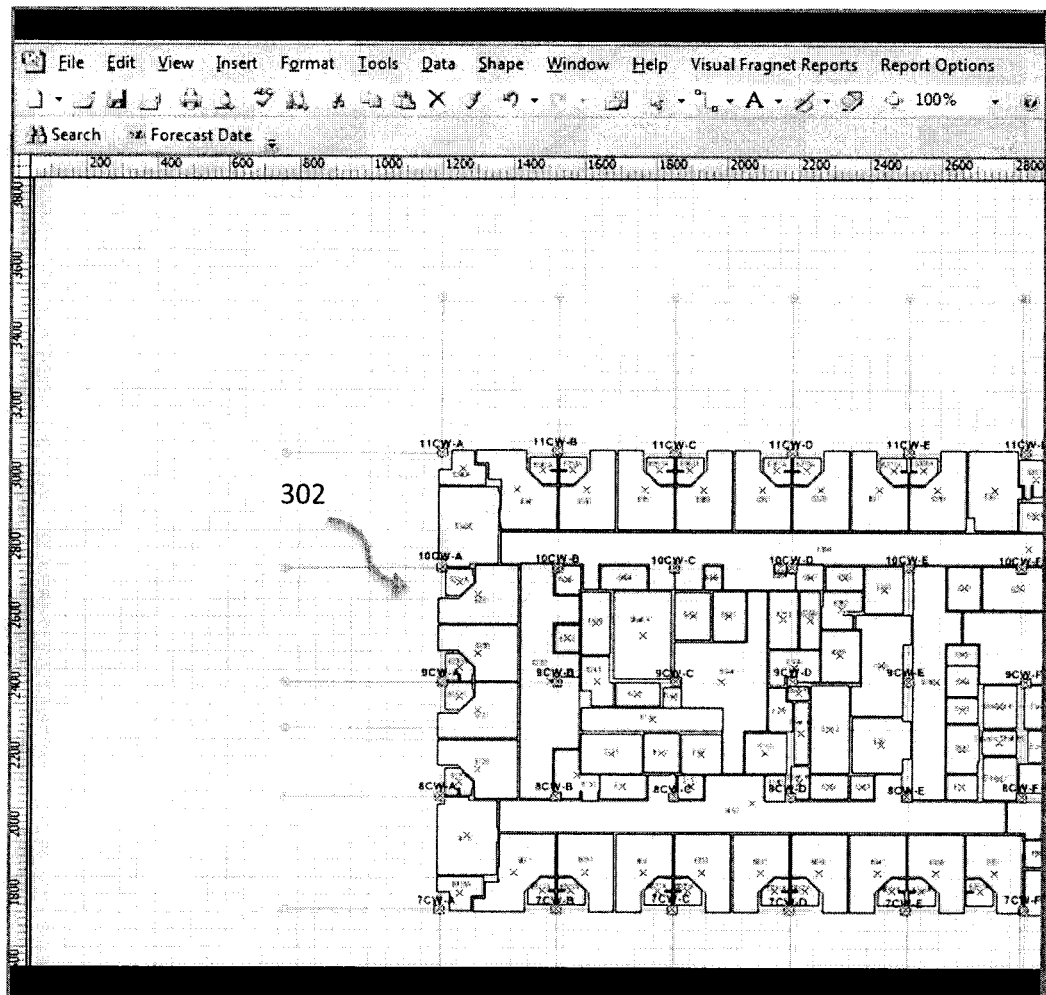
FIG. 3 illustrates a display view of a floor plan.

Having assigned a date to your selected rooms, the visual fragnet or colorized map will automatically reload in order to show the change. As shown in FIG. 3, the selected rooms 302 are now a different color which will signify something different depending on what report is being run. A user would have to look at the Key. Some colors are standardized and some colors are assigned randomly. Thus, one report may show the rooms in red, while another report may show them in purple. In this example, the rooms are colorized based on a proximity report which shows how far out each of the rooms are from a forecast date associated with an inspection type.

Figure 4:
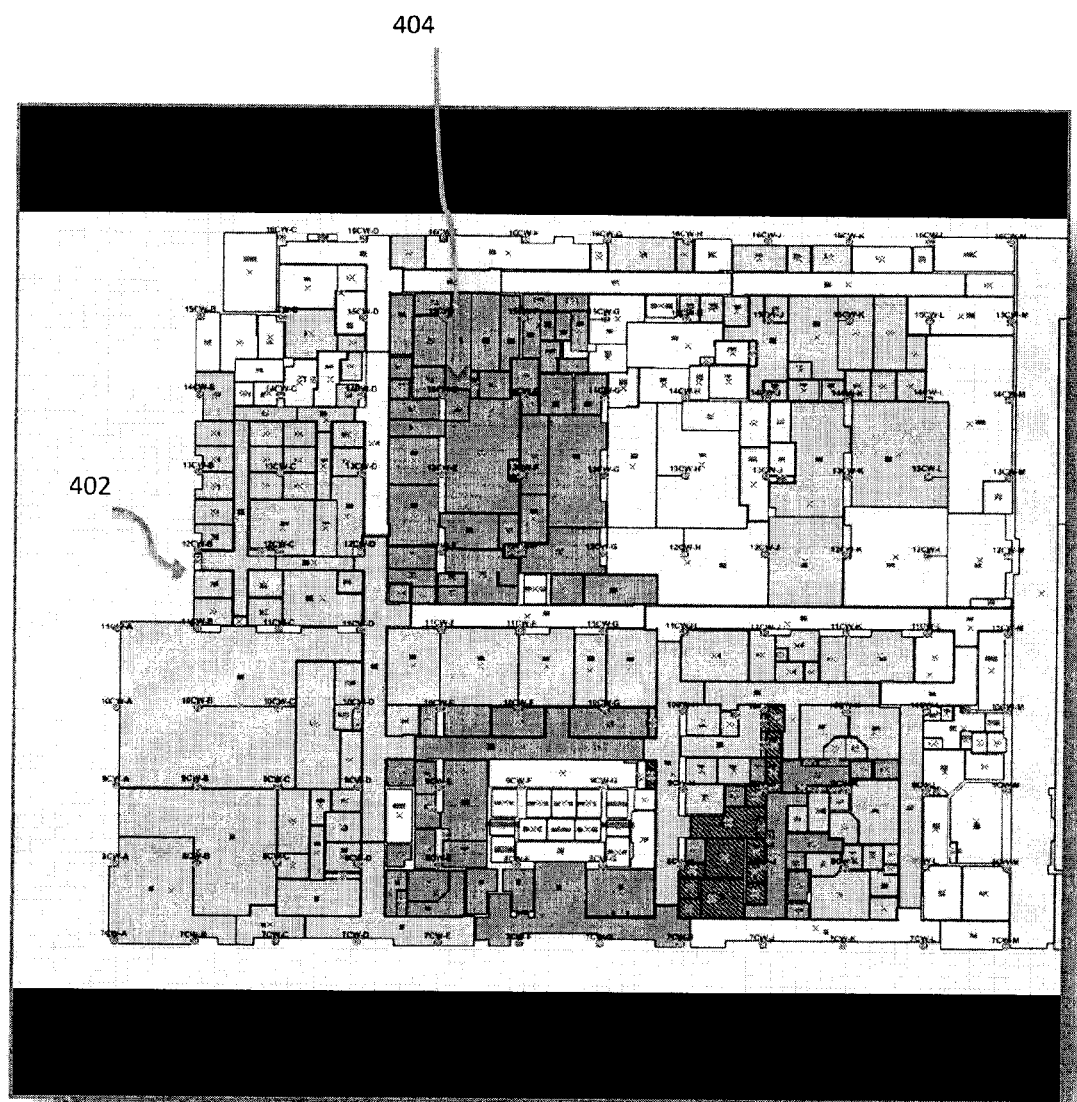
FIG. 4 illustrates a display of a floor plan.

FIG. 4 is a colorized map or visual fragnet showing forecast and proximity based on a report that was run. This colorized map or visual fragnet provides the user with a special colorization sequence based on how close the forecast date is to the current date. This allows the user to quickly identify all the rooms that are near their forecasted date so that they can mobilize additional resources in order to meet their deadline. Additionally, once the room has been inspected and approved, it will show up in the "Closed" status to show that it is completed.

Once the visual fragnet has finished loading, the user can utilize the key to obtain the associated data and identify the number of rooms that are close to or past their forecast date. It can be visually seen that the rooms do not all have the same color or shading, because each set is a different number of days away form their forecast date. For example the rooms 402 are a different shade or different color from rooms 404. This means each set of rooms is associated with a different forecast date for the inspection type selected, and therefore the color on the floor plan will be different since the color correlates to the number of days out each room or set of rooms are from the forecast date associated with the rooms for that inspection type.

Figure 5:
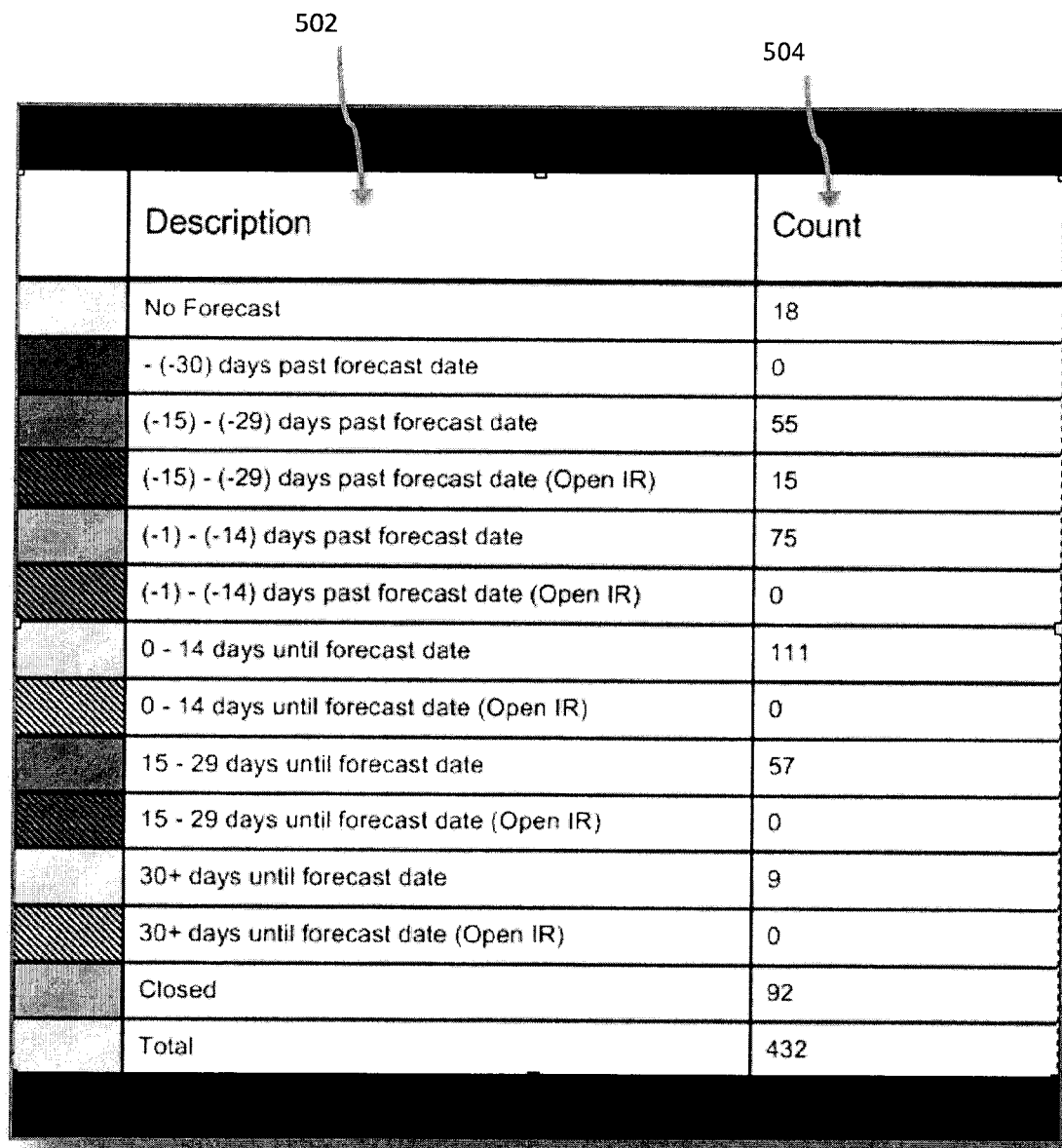
FIG. 5 illustrates a display of a key of a floor plan.

The key is shown in FIG. 5. Furthermore, the ranges can be customized to meet the project needs and updated over time if desired. The ranges in the FIG. 5 report can be changed depending on what the project wants. Some projects want to have ranges that are 10 days long and some want some that are 5 days long. (FIG. 5 shows 15-day ranges. These ranges can be customized by the user. A general description 502 is given for each color. For example, one color is selected for rooms that are less than 30 days past their forecast date, another one is chosen for rooms 30 days plus until their forecast date. Rooms or areas can be associated with forecast dates that are in the past. Therefore, if a forecast date is before the current date the number of days out is a negative number, because the current date is past its inspection date. These rooms are associated with forecast dates in the past.

In one embodiment, a count 405 is also shown for the number of rooms that are associated with the number of days out.

Figure 6:
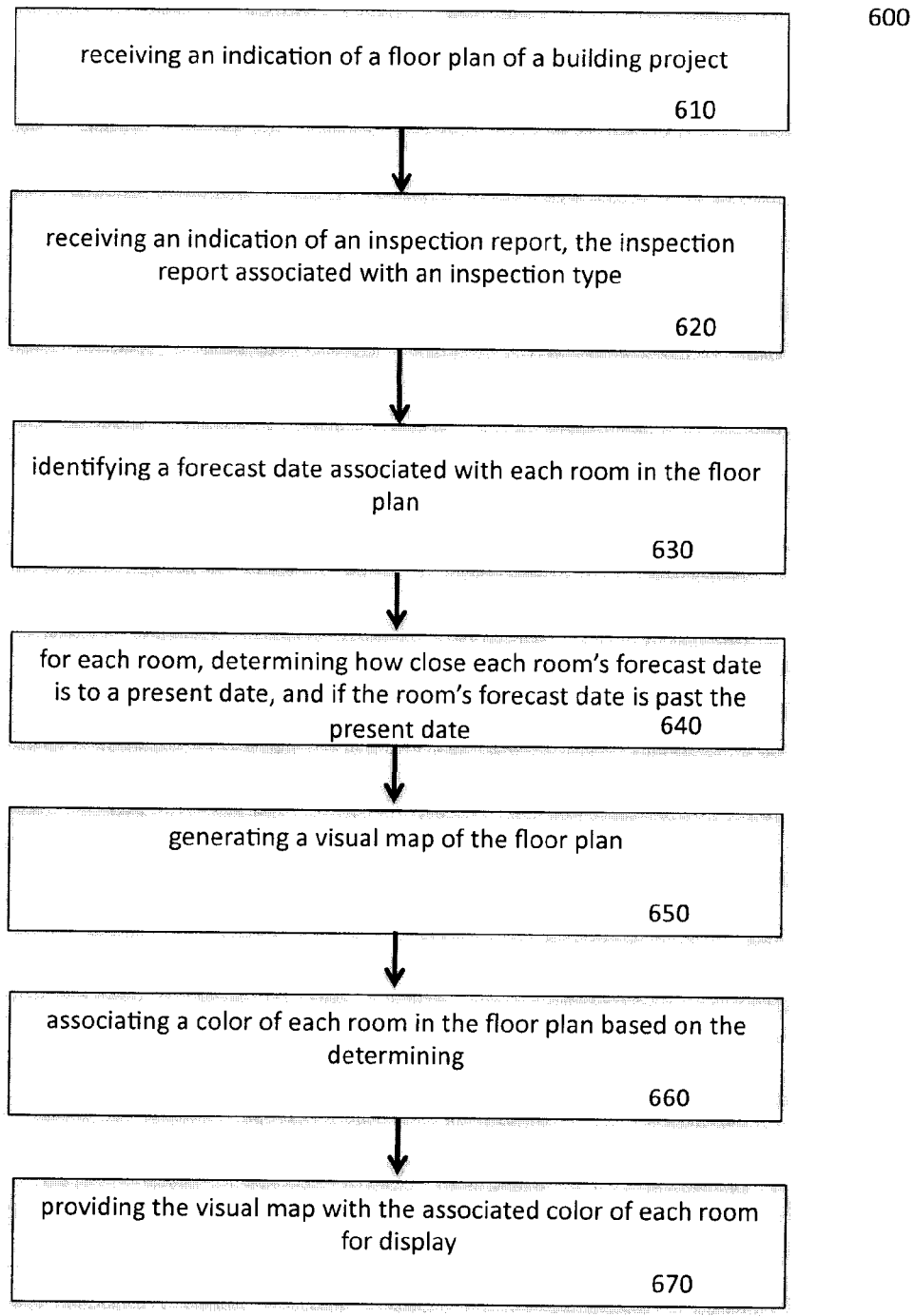
FIG. 6 illustrates a flowchart of an example process.

FIG. 6 illustrates a flowchart of an example process 600. The process may be implemented by inspection system 104 or visual system 100.

At stage 610, an indication of a floor plan of a building project is received. For example, inspection system 104 receives an indication of a floor plan of a building project is received. A building can include many different levels and a floor plan can be associated with each level.

At stage 620, an indication of an inspection report is received. The inspection report can be associated with an inspection type. For example, inspection system 104 receives an indication of an inspection report. An inspection type can be associated with a construction phase of the project. Examples of inspection types can include electrical, mechanical, plumbing, drywall etc.

At stage 630, a forecast date associated with each room in the floor plan is identified. The forecast date can indicate when an inspection type associated with the respective room is to be completed. For example, inspection system 104 identifies a forecast date associated with each room in the floor plan. The forecast date is set by the user. The user decides when they need the inspection type for the room completed. The user, can for example, be a general contractor of a project. The forecast date can be a date in the future. In one embodiment, the forecast date can be a number of days out from the current date. For example, the user can set the forecast date of the electrical inspection as 30 days out from the current date instead of selecting an actual date. Inspection system 104 can calculate the date that 30 days would fall on.

At stage 640, for each room, a determination is made of how close each room's forecast date is to a present date, and if the room's forecast date is past the present date. For example, inspection system 104 determines how close each room's forecast date is to a present date, and if the room's forecast date is past the present date. Inspection system 104 can compare the current date to the forecast date of the inspection type. The number of days in between the two dates can be calculated and inspection system 104 can determine how many days out each forecast date is for a specific inspection type. For example, if the current date is Mar. 12, 2013, and the electrical inspection has a forecast date of Jul. 12, 2013, inspection system 104 can calculate that the electrical inspection is 120 days out.

At stage 650, a visual map of the floor plan is generated. For example, inspection system 104 generates the visual map of the floor plan. The visual map displays the rooms of the floor plan. Initially each room and each area in the floor plan can be a single color, for example, white. Each room is part of an area that is associated with a forecast date for each inspection type. An area can include one or more rooms. In one embodiment, each room is associated with a forecast date for each inspection type.

At stage 660, a color is associated with each room in the floor plan based on the determining. For example, inspection system 104 associated a color with each room in the floor plan based on the determining. Inspection 104 can associate a color for various ranges of dates. For example if a room is less than 5 days out from the forecast date, the color can be red, if a room is 30 days out from a forecast date the room can be green, if a room is 90 days out the room can be blue etc.

In one embodiment, inspection system 104 can use the same color but as the number of days get less, the color can become a darker version of one color. In the same example as above, if a room is less than 5 days out from the forecast date, the color can be dark red, if a room is 30 days out from a forecast date the room can be a regular red color lighter than the dark red, if a room is 90 days out the room can be pink, so a lighter version of the range above this one.

At stage 670, the visual map with the associated color of each room is provided for display. For example, inspection system 104 provides for display the visual map with the associated colors. The map can include the range or ranges and the color associated with each. For example, the map (or key) can include: less than 5 days and show a dark red color next to it, or show a regular red and show 30 days out, and show a pink and show more than 90 days out.

In one embodiment, the user can change the forecast dates of each inspection type. As the user changes the dates, the colors on the map will dynamically change. The forecast dates can be changed to be closer to the present date or farther from the present date. When a report is run for a specific inspection type, and the dates are changed, the user can see the new colors on the map based on how far out each room or area is now with the new forecast dates.

In one embodiment, a method can include receiving a selection of a floor of a building project. The selection can be received from a user device. A user may be using the user device and select a floor of a building project from a given number of floors. Each floor has a floor plan associated with it.

The method can also include receiving a selection of an inspection type associated with the building project. The user can be presented with a number of different inspection types to choose. In one embodiment, the user can type in a specific inspection type. Inspection system 104 receives the selection of the floor and the inspection type.

The method can further include receiving a selection of a forecast report, wherein the forecast report displays each room of the floor of the building project in a color indicating how close each room's assigned forecast date is to a present date.

The method can further include displaying a floor plan associated with the floor and inspection report, wherein the floor plan includes rooms that are each colored based on how close each room's assigned forecast date is to the present date. Inspection system can determine if each room in the floor plan is associated with a forecast date for the selected inspection type. Then inspection system 104 can calculate how far out each forecast date is from the current date. Inspection system 104 can generate a floor plan of colored rooms based on how far out each room is. Each room can be associated with the inspection type selected and also be associated with its own forecast date as selected by a user, for example, the general contractor. The floor plan is displayed on a display device showing each room colored according to a map or a key displayed with the floor plan.

In an embodiment, the functionality of 100 and/or system 104 may be provided through a browser on computing devices, such as user device 110. Inspection system 104 on server 120 may host the service and serve it to device 110 and any other computing devices. Any combination of implementations may provide, through a browser, the functionality represented by the example implementations of systems 100 and 104 shown in FIG. 1 and in the display views and flowchart of FIGS. 2-6. Any stages shown in flowchart 600 that involve displaying content may be considered to provide the content for display in a browser.

Figure 7:
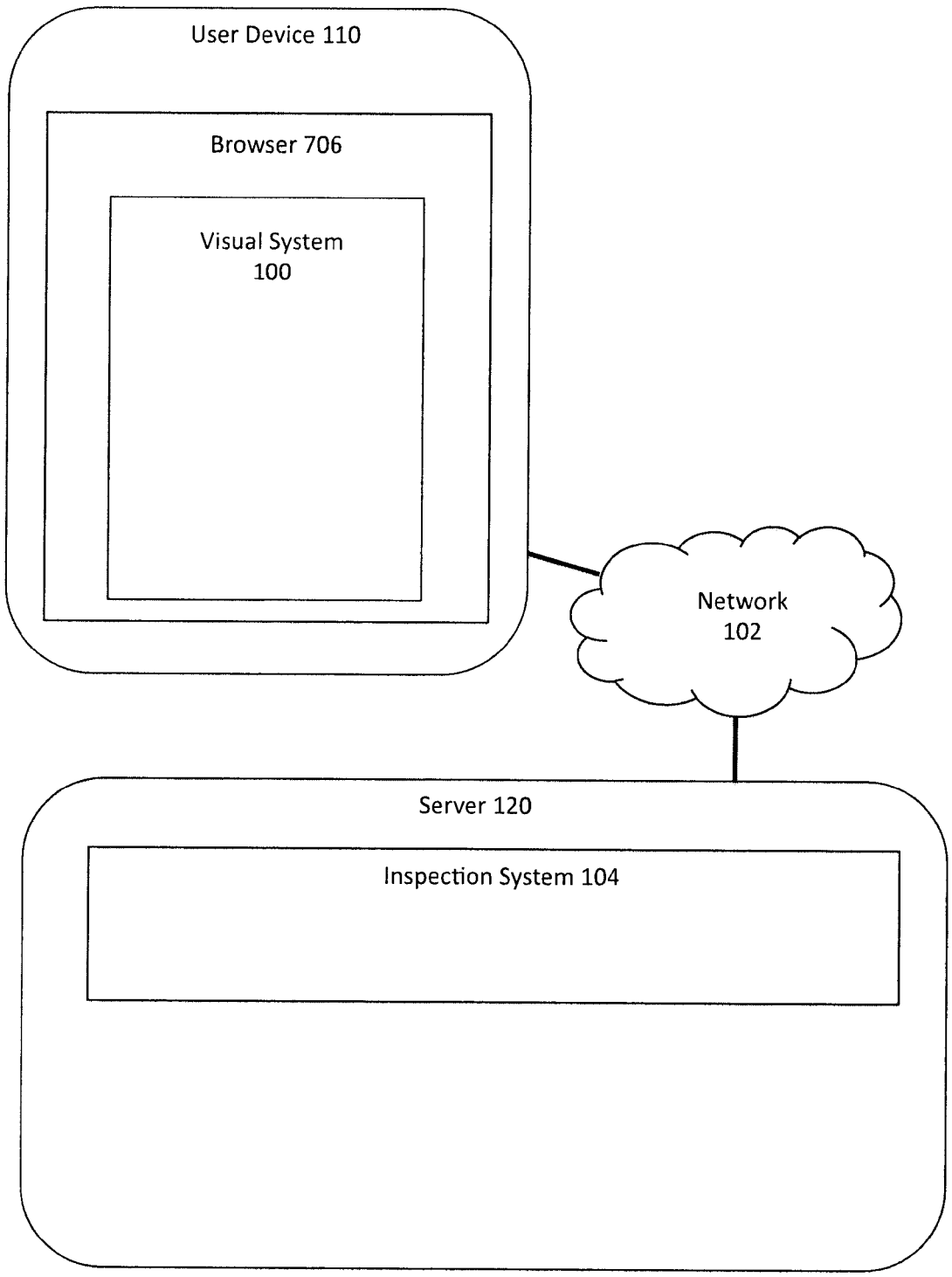
FIG. 7 illustrates an example user device including a browser.

For example, FIG. 7 shows user device 110 executing browser 702. Browser 702 may be any commonly used browser, including any multi-threaded or multi-process browser. In an embodiment, the functionality of visual system 100 can be provided through browser 702. Future dates are received or displayed in browser 702.

The functionality of any of the components or flowcharts shown in FIGS. 1-6 may be provided through a browser executed on device 110, server 120 or any other computing device. The web pages or application provided through the browser may be served from server 120, device 110, or any other computing device. Different windows or views may be shown through browser 702. Different permissions or filters may be established based on the identity or roles of the individual logging into a website view.

System 100 and 104 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop, or any other user carried device), game console, set-top box, kiosk, embedded system or other device having at least one processor and memory. A computing device may include a communication port or I/O device for communicating over wired or wireless communication link(s).

Computing devices such as a monitor, all-in-one computer, smart phone, tablet computer, remote control, etc., may include a touch screen display that accepts user input via touching operations performed by a user's fingers or other instrument. For example purposes, a touch sensor grid may overlay the display area. The touch sensor grid contains many touch sensitive areas or cells that may be used to locate the area closest to the input of a user's touch.

Example touch operations using a touch screen display may include (but are not limited to) pinching, finger (or other stylus or object) touches, finger releases, and finger slides. Finger slides may be circular or any other shape, direction or pattern. The touch screen display may include a screen or monitor that may render text and/or images.

Figure 8:
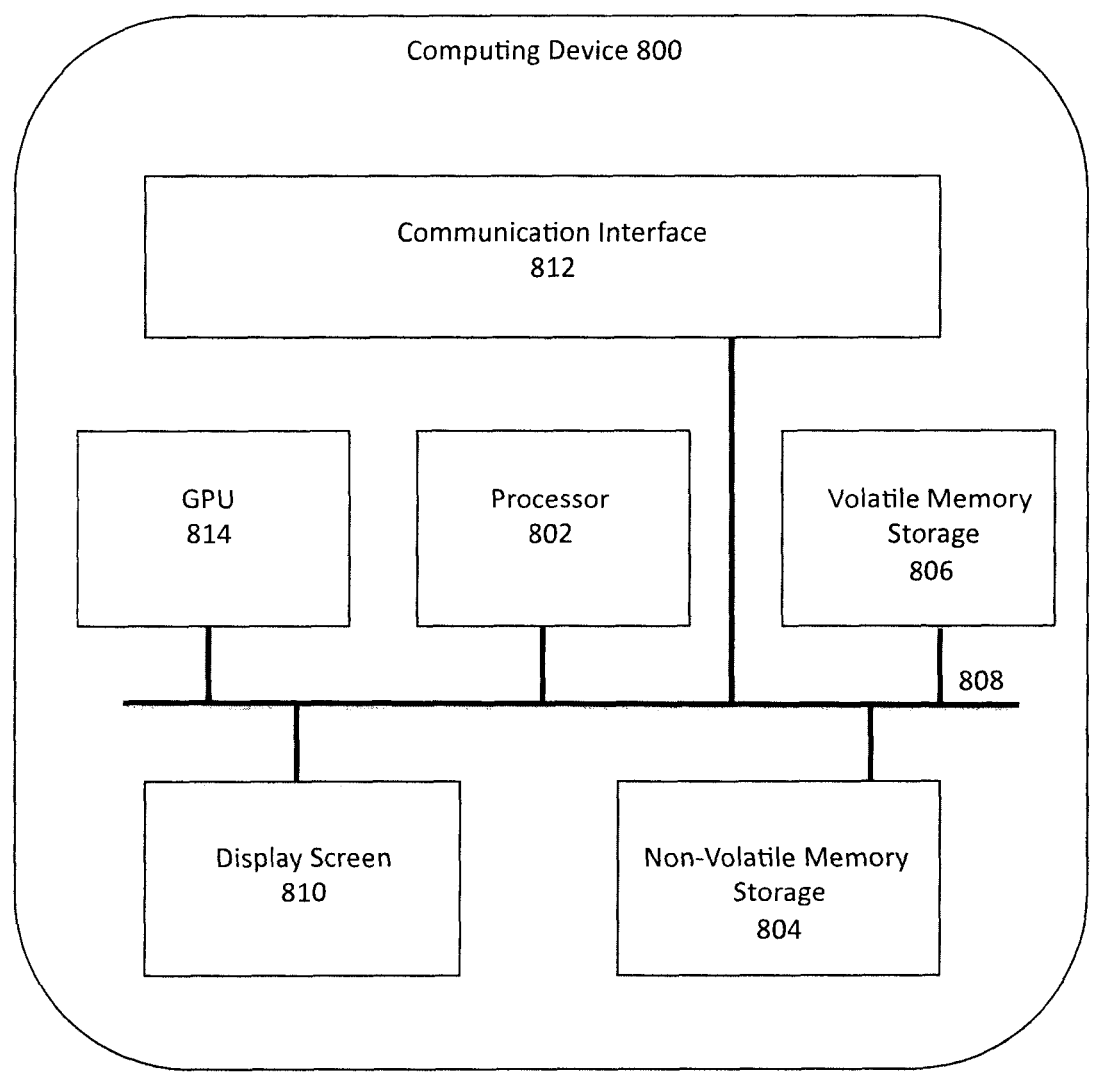
FIG. 8 is a diagram of an example computer device used to implement the system.

FIG. 8 is an example computer system 800 in which embodiments of the present invention, or portions thereof, may be implemented as computer-readable code. For example, the components of systems 100 and 104 may be implemented in one or more computer systems 800 using hardware, software implemented with hardware, firmware, tangible computer-readable media having instructions stored thereon, or a combination thereof and may be implemented in one or more computer systems or other processing systems. Components in FIGS. 1-7 may be embodied in any combination of hardware and software.

Computing devices, such as devices 110 or server 120, may include one or more processors 802, one or more non-volatile storage mediums 804, one or more memory devices 806, a communication infrastructure 808, a display screen 810 and a communication interface 812.

Processors 802 may include any conventional or special purpose processor, including, but not limited to, digital signal processor (DSP), field programmable gate array (FPGA), application specific integrated circuit (ASIC), and multi-core processors.

GPU 814 is a specialized processor that executes instructions and programs, selected for complex graphics and mathematical operations, in parallel.

Non-volatile storage 804 may include one or more of a hard disk drive, flash memory, and like devices that may store computer program instructions and data on computer-readable media. One or more of non-volatile storage device 904 may be a removable storage device.

Memory devices 806 may include one or more volatile memory devices such as but not limited to, random access memory. Communication infrastructure 808 may include one or more device interconnection buses such as Ethernet, Peripheral Component Interconnect (PCI), and the like.

Typically, computer instructions are executed using one or more processors 802 and can be stored in non-volatile storage medium 804 or memory devices 806.

Display screen 810 allows results of the computer operations to be displayed to a user or an application developer.

Communication interface 812 allows software and data to be transferred between computer system 800 and external devices. Communication interface 812 may include a modem, a network interface (such as an Ethernet card), a communications port, a PCMCIA slot and card, or the like. Software and data transferred via communication interface 812 may be in the form of signals, which may be electronic, electromagnetic, optical, or other signals capable of being received by communication interface 812. These signals may be provided to communication interface 812 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein.

Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

What is claimed is:

1. A computer-implemented method comprising:
    receiving, by a processor, information defining a floor plan of a building project, the floor plan comprising a plurality of rooms;
    identifying, by the processor, for each of the plurality of rooms in the floor plan, a respective specified date indicating when an activity associated with the respective room is to be completed;
    for each room in the plurality of rooms, determining, by the processor, a time period between the associated specified date and a present date;

generating, by the processor, a visual map of the floor plan;

for each room in the plurality of rooms, determining, by the processor, a color characteristic of the respective room based on the associated time period; and causing a display device to display the visual map, wherein each respective room in the plurality of rooms is displayed in the visual map based on the associated color characteristic.

2. The computer-implemented method of claim 1, wherein the activity includes an inspection.

3. The computer-implemented method of claim 2, wherein the inspection includes one of an electrical-type inspection, a mechanical-type inspection, a plumbing-type inspection, and a drywall-type inspection.

4. The computer-implemented method of claim 2, further comprising:

receiving from a user a selection of an inspection type from among a plurality of inspection types; and identifying, by the processor, for each of the plurality of rooms in the floor plan, a respective specified date indicating when an inspection of the selected inspection type is to be completed for the respective room.

5. The computer-implemented method of claim 1, wherein the color characteristic comprises one of a color and a selected shade of a selected color.

6. The computer-implemented method of claim 1, wherein determining a color characteristic of a respective room based on the associated time period further comprises:

associating a first color with the respective room if the associated specified date is after the present date; and associating a second color with the respective room if the associated specified date is in the past.

7. The computer-implemented method of claim 1, wherein determining a color characteristic of a respective room based on the associated time period further comprises:

associating a first shade of a selected color with the respective room if the associated specified date is after the present date; and associating a second shade of the selected color with the respective room if the associated specified date is in the past.

8. A method comprising:

obtaining, by a processor, information representing a plurality of rooms in a structure;

determining, by the processor, for each of the plurality of rooms:

a first date indicating when a respective event associated with the respective room is scheduled to occur;

a status of the first date relative to a second date; and a visual characteristic for the respective room, based on the status; and causing a display device to display a map that includes the plurality of rooms, wherein each of the plurality of rooms is displayed based on the associated visual characteristic.

9. The method of claim 8, wherein the respective event includes an inspection.

10. The method of claim 9, wherein the inspection includes one of an electrical-type inspection, a mechanical-type inspection, a plumbing-type inspection, and a drywall-type inspection.

11. The method of claim 9, further comprising:

receiving from a user a selection of an inspection type from among a plurality of inspection types; and identifying, by the processor, for each of the plurality of rooms in the floor plan, a respective specified date indicating when an inspection of the selected inspection type is to be completed for the respective room.

12. The method of claim 8, wherein the visual characteristic comprises one of a color and a selected shade of a selected color.

13. The method of claim 8, wherein the second date is the present date.

14. The method of claim 13, wherein determining a visual characteristic for a respective room further comprises:

associating a first color with the respective room if the first date is after the second date; and associating a second color with the respective room if the first date is in the past.

15. The method of claim 13, wherein determining a visual characteristic of a respective room based on the associated time period further comprises:

associating a first shade of a selected color with the respective room if the first date is after the second date; and associating a second shade of the selected color with the respective room if the first date is in the past.

16. A device comprising:

a display device adapted to display data and images;

a memory adapted to store information defining a floor plan of a building project, the floor plan comprising a plurality of rooms; and at least one processor adapted to:

identify, for each of the plurality of rooms in the floor plan, a respective specified date indicating when an activity associated with the respective room is to be completed;

determine, for each room in the plurality of rooms, a time period between the associated specified date and a present date;

generate a visual map of the floor plan;

determine, for each room in the plurality of rooms, a color characteristic of the respective room based on the associated time period; and cause the display device to display the visual map, wherein each respective room in the plurality of rooms is displayed in the visual map based on the associated color characteristic.

17. The device of claim 16, wherein the activity includes an inspection.

18. The device of claim 17, wherein the inspection includes one of an electrical-type inspection, a mechanical-type inspection, a plumbing-type inspection, and a drywall-type inspection.

19. The device of claim 17, wherein the at least one processor is further adapted to:

receive from a user a selection of an inspection type from among a plurality of inspection types; and identify, for each of the plurality of rooms in the floor plan, a respective specified date indicating when an inspection of the selected inspection type is to be completed for the respective room.

20. The device of claim 16, wherein the color characteristic comprises one of a color and a selected shade of a selected color.

* * * * *